United States Patent [19]

Cohen

[11] E Re. 28,733

[45] Reissued Mar. 9, 1976

[54] METHOD OF MAKING A CAST GUIDE FOR FOLDING FLEXIBLE SHEETS

[76] Inventor: Elie Cohen, 1, rue Marcel Cavignac, Perigueux (Dordogne), France

[22] Filed: Jan. 6, 1975

[21] Appl. No.: 539,001

Related U.S. Patent Documents

Reissue of:

[64] Patent No.: 3,822,335
Issued: July 2, 1974
Appl. No.: 298,585
Filed: Oct. 18, 1972

[30] Foreign Application Priority Data

Oct. 29, 1971 France ..... 71.39056

[52] U.S. Cl. ..... 264/219; 264/221; 264/316; 264/317; 264/339; 264/DIG. 44

[51] Int. Cl.[2] ..... B29C 1/08

[58] Field of Search ..... 264/221, 317, 299, 226, 264/313, 219, 285, 316, 339, DIG. 44; 425/DIG. 12; 249/61, 62

[56] References Cited

UNITED STATES PATENTS

| | | | |
|---|---|---|---|
| 3,021,241 | 2/1962 | Schneiderman et al. | 264/317 |
| 3,136,831 | 6/1964 | Zinn | 264/317 X |
| 3,141,052 | 7/1964 | Labash | 264/317 X |
| 3,233,310 | 2/1966 | Corl | 264/313 X |

FOREIGN PATENTS OR APPLICATIONS

| | | | |
|---|---|---|---|
| 581,251 | 8/1959 | Canada | 242/157 R |

OTHER PUBLICATIONS

Skeist et al.: Epoxy Resins, Reinhold, N.Y., (1964), pp. 136–143 relied on.

Weast et al.: Handbook of Chemistry and Physics, Chem. Rubber Co., Cleveland, (1969), pp. B82, B120 and B173 relied on.

Simonds et al.: A Concise Guide to Plastics, Reinhold, N.Y., (1963), p. 242 relied on.

*Primary Examiner*—Willard E. Hoag
*Attorney, Agent, or Firm*—Jones, Thomas & Askew

[57] ABSTRACT

The invention relates to a method for producing a guiding device for flexible materials in which an element, representing the actual guide passage to be produced, is made with the aid of a malleable material; the element is positioned in a mould which has the general shape of the outer contour of the device to be produced; a resin is cast inside this mould and onto the element, and the malleable material constituting the inner element is then eliminated with the aid of an agent which has no action on the resin.

7 Claims, 4 Drawing Figures

METHOD OF MAKING A CAST GUIDE FOR FOLDING FLEXIBLE SHEETS

Matter enclosed in heavy brackets [ ] appears in the original patent but forms no part of this reissue specification; matter printed in italics indicates the additions made by reissue.

The invention relates to a method for producing a guiding device for flexible materials, as well as the device obtained by implementing this method.

Guiding devices are already known and used in various fields in industry to convey a strip or a thread of a flexible product to near a transformation or user station. Thus, in the textile industry, such guides are used to bring cloth strips to near the needle or needles of a sewing machine.

These devices are made with the aid of folded metal sheets, which are bent and welded to one another, to form conduits or passages which guide the cloth or similar toward the needles of a sewing machine, these passages in general being made in a way such that they fold over the textile material strip in order to make various articles, such as straps of brassieres, trouser belts, braid and, in general, to make composite strips obtained by folding and sewing one or several cloth strips, or elastic material or other material.

However, such devices are very difficult to make, require skilled labour and are costly to produce. In addition, these guides do not make it possible to obtain results which are impeccable from the technical point of view, since the guide passages are not made sufficiently accurately, and this causes irregularities in the folding of the cloth strips and in their positioning with respect to one another and in the positioning of the seams.

The particular object of the present invention is to overcome these disadvantages and therefore relates, to this end, to a method for producing a guiding device for flexible materials characterized in that an element, representing the actual guide passage to be produced is made with the aid of a malleable material; the element is positioned in a mould which has the general shape of the outer contour of the device to be produced, a resin is cast inside this mould and onto the element, and the malleable material constituting the inner element is then eliminated with the aid of an agent which has no action on the resin.

According to another characteristic feature of the invention, the malleable material is thermoplastic and this element is eliminated by the effect of temperature.

According to yet another characteristic feature of the invention, the malleable material is affected by chemical agents and the element is eliminated with the aid of a chemical product which destroys this material inside the device, without acting upon the resin.

Figure 1:
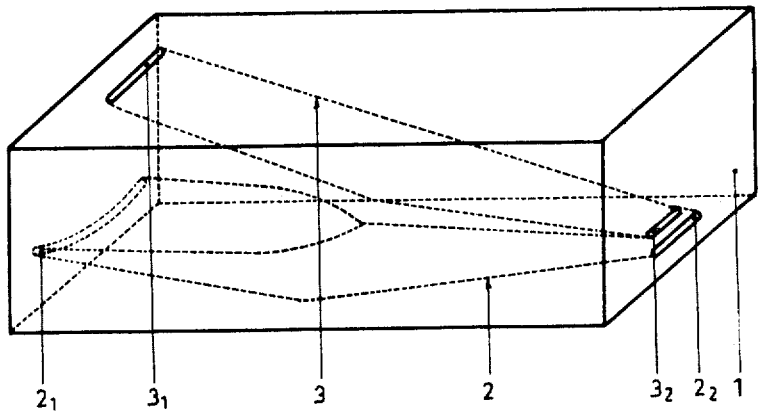

The invention is illustrated by way of non-limitative examples on the accompanying drawings in which:

FIG. 1 is a schematic perspective view of an embodiment of the invention.

Figure 2:
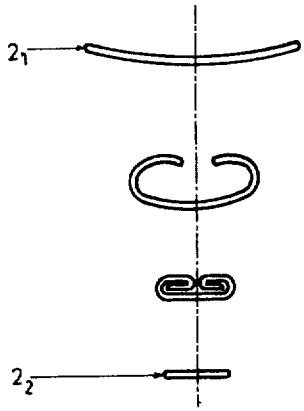
Figure 3:
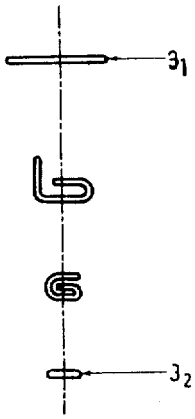

FIGS. 2 and 3 respectively represent, in successive cross-sections, the upper and lower guide passages of the device shown in FIG. 1, these cross-sections being made from left to right in this FIG. 1.

Figure 4:
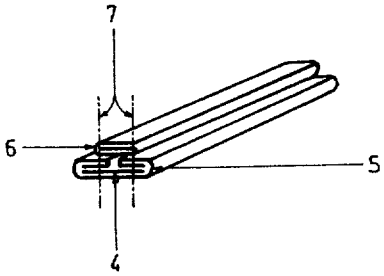

FIG. 4 is a schematic perspective view of the production of a composite cloth strip with the aid of the device of the invention.

The object of the present invention is therefore to provide a guiding device for flexible materials, such as a strip of cloth or a ribbon which, by providing guide passages of complex shape, can fold and position one or several strips or ribbons, and convey them accurately to close to a work station and in particular to close to the needles of a sewing machine.

In addition, the object of the present invention, is to provide guide passages which are very accurate, while being simple and rapid to make, the dimensions of the device also being relatively small while at the same time not imposing any limit on the complexity of folding operations and on the number of combined passages inside the device.

In addition, the method according to the invention makes it possible to obtain guide passages with smooth inner wall without any difficulty, so as not to cause any local braking action on the cloth strip, such braking causing local elongation of the strip and resulting in the finished article being of bad quality. In addition, roughness or other irregularities of the walls of the passages cause fluff from the cloth strip to accumulate, which causes the partial or even total blockage of these passages.

The method according to the invention consists of forming the actual passages to be made with the aid of a malleable material and then pouring a resin onto these positive elements after having positioned them on a mould. The malleable material must be of the type that is affected by an agent which has no action on the resin and it is then possible to eliminate this malleable material and obtain a guiding device having all the desirable properties.

Thus, in FIG. 1, a guiding device is shown in the form of a unit of parallelepiped shape 1, inside which two passages have been made, a lower passage 2 and an upper passage 3, the ends $2_1$, $2_2$ and $3_1$, $3_2$ of these two passages opening out in the periphery of the parallelepiped unit 1, so as to enable the flexible material such as a cloth to be guided.

In the example illustrated, the materials to be folded and positioned are introduced through the openings $2_1$ and $3_1$ and then folded over in the desired manner inside the unit by the very shape of these passages, emerging through the orifices $2_2$ and $3_2$.

The guide unit 1 enables a composite cloth strip such as is shown in FIG. 4 to be obtained, consisting of a central element 4, made for example of polyurethane foam, around which is wound a cloth strip 5 in the manner shown, the two strips 4 and 5 having been introduced flat through the opening $2_1$.

Likewise, the composite strip shown in FIG. 4 comprises a ribbon 6, folded in the manner shown in FIG. 4, this strip being introduced flat through the opening $3_1$ and emerging folded through the opening $3_2$, being positioned above the folded strips 4 and 5.

The unit 1 is located close to the needles of a sewing machine and it is then possible to sew together the various strips in the direction of the length at 7, to obtain the desired composite strip.

FIGS. 2 and 3 show, in successive cross-sections the shapes of the passages 2 and 3 inside the guiding device 1.

The nature of the malleable material as well as that of the resin can be any desired, it being understood that, according to the invention, the malleable material must be affected by some agent which however has no action on the resin. Thus, the malleable material can be made of wax, being fashioned from a sheet to produce accurately a positive element representing the passages 2 and 3.

This positive element, after over-moulding the resin, is destroyed by the effect of temperature or by chemical action.

In particular, when the resin constituting the unit 1 consists of an epoxide resin, use is made of the rising temperature which occurs during solidification as the result of the action of an accelerator to melt the wax, while the epoxide resin is in the process of solidification.

Likewise, the positive element representing the passages can be obtained from lead sheets, the elimination of these sheets from the resin unit being effected by a chemical agent which has no action on the solidified epoxide resin. Likewise, the malleable material can consist of a cloth strip impregnated with a material such as starch, and the passages can then be freed from the unit, either by a chemical agent, or by tearing away the malleable strip, making use for this purpose of the shrinkage which naturally occurs in the resin during its solidification, this shrinkage causing the resin to separate from the malleable material.

In addition, the resin used for making the guide unit should preferably consist of a transparent resin so that the correctness of the movement of the flexible strip guided inside the unit can be verified at any moment.

According to the invention, the dimensions of the passages, width and thickness, can be obtained with accuracy along their entire length, to match exactly the dimensions of the material to be guided inside these passages, irrespective of the complexity of their shape, the walls of these passages, in addition, are smooth so as not to hinder the free passage of the cloth at any point.

These passages can also be made in the form of lateral slits which are determined according to the article to be made.

Likewise, in the case of the assembly of several folded items, several super-imposed guiding elements overlapping one another can be used.

The units according to the invention can also be made in the form of cubes which can comprise several types of passage which can be used in any way desired according to the work to be carried out. The inlets and outlets of the passages of the guiding devices can comprise rounded metallic parts to prevent wear when an abrasive material is used.

The guiding device can be secured to the work station by any means desired, for example with a magnet incorporated in the unit.

The guiding device can also be made of several parts enabling the passages to be opened for cleaning; likewise, one of the parts of the unit can be movable and adjustable so that the width of the passage can be adjusted.

Of course, the invention is not limited to the examples of its embodiment herein above described and illustrated, and on the basis of which other methods and forms of embodiment can be envisaged without departing from the scope of the invention.

In particular, it will be understood that the term "resin" as used in the present application, refers to any product which can be placed in position in a liquid or pasty state under certain conditions, and become solid under other conditions these conditions resulting from an effect of temperature of a chemical reaction.

What I claim is:

1. A method of making a guide for forming a lengthwise folded flexible web comprising:

providing a flat sheet of malleable material, leaving flat one end of said sheet, folding generally lengthwise said malleable material adjacent the other end thereof so that said material adjacent said other end has folds corresponding to desired folds of said folded flexible web while also folding said malleable material intermediate the two ends so as to form a gradual transition between said flat one end and folds of said material adjacent said other end; placing the malleable sheet material in a mold with the ends of the malleable sheet material extending through the ends of the mold; casting and hardening a resin inside the mold and about both sides of the malleable sheet material; and eliminating the malleable sheet material.

2. Method according to Claim 1 in which the malleable material is affected by chemical agents and the step of eliminating the malleable sheet material comprises the application of a chemical agent to the malleable sheet material to destroy it.

3. Method according to Claim 1 in which the malleable sheet material is wax.

4. Method according to Claim 1 in which the malleable sheet material is lead.

5. Method according to Claim 1 in which the malleable sheet material is an impregnated cloth.

6. Method according to Claim 1 in which the malleable material is thermoplastic and the step of eliminating the malleable sheet material comprises heating the thermoplastic malleable sheet material to melt it.

7. Method according to Claim 6 in which the resin is an epoxide resin and the rise in temperature during the solidification of the resin eliminates the thermoplastic malleable sheet material.

* * * * *